Patented July 15, 1952

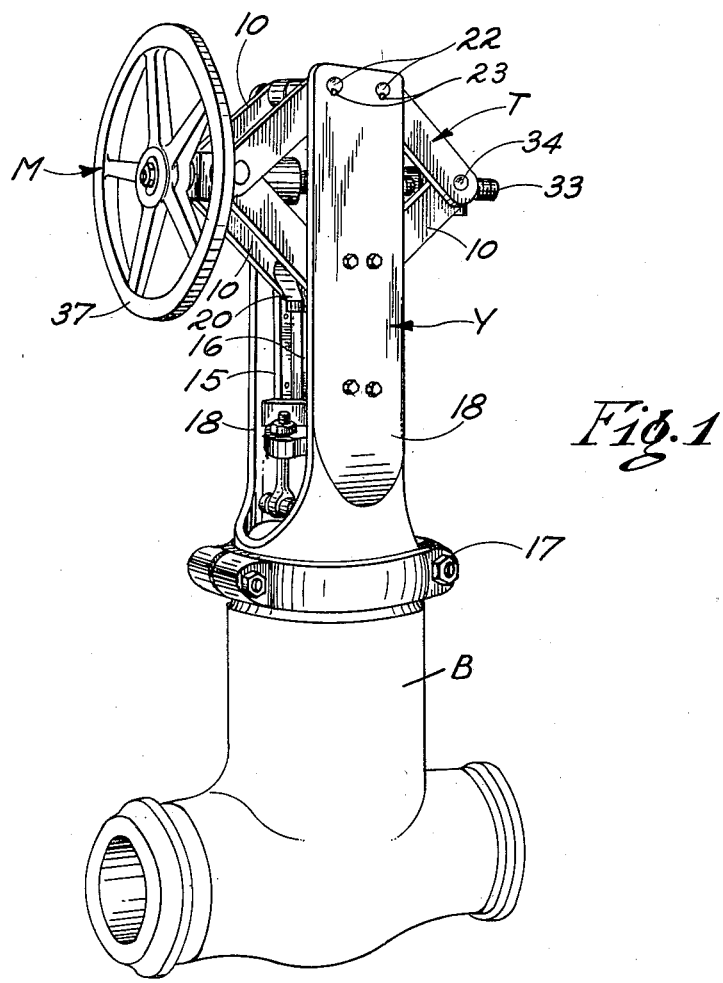

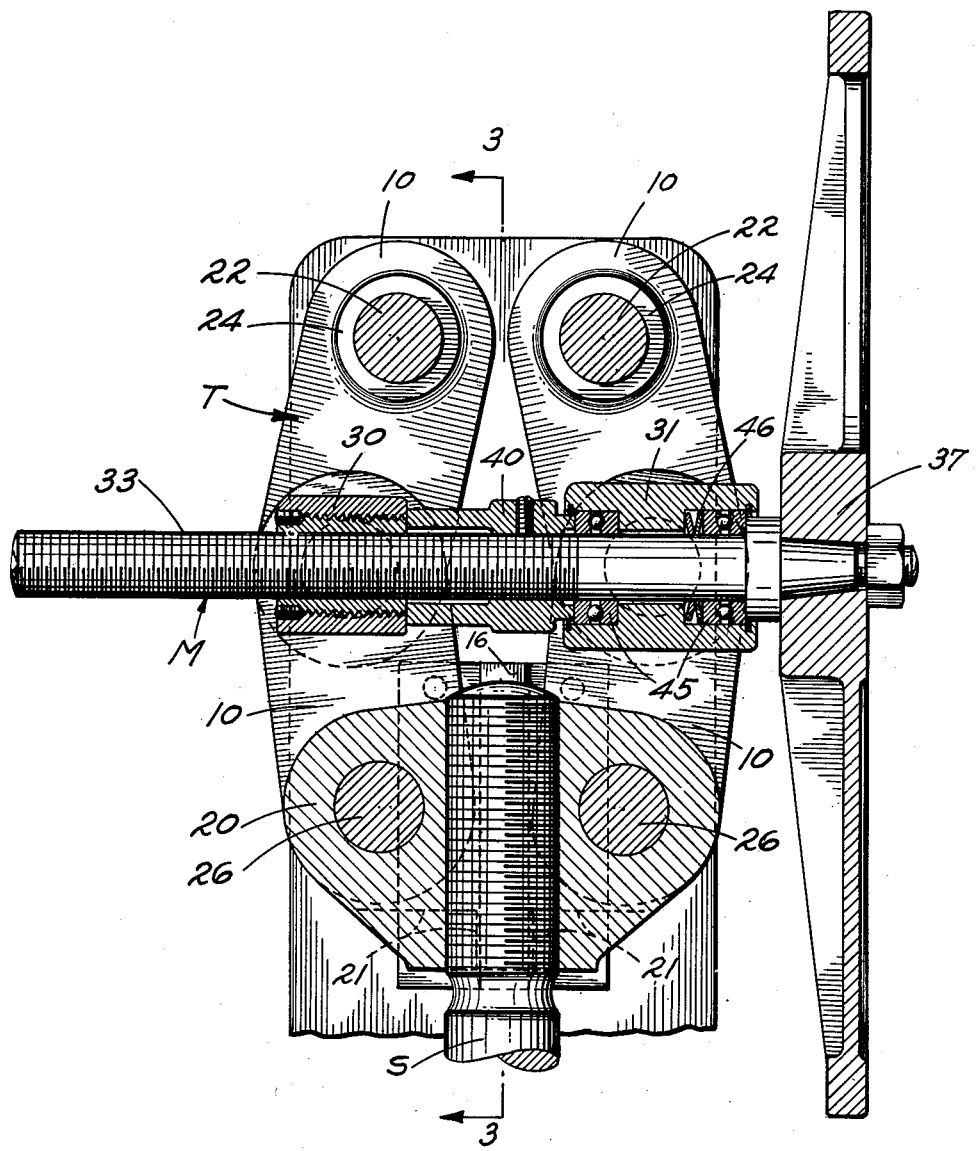

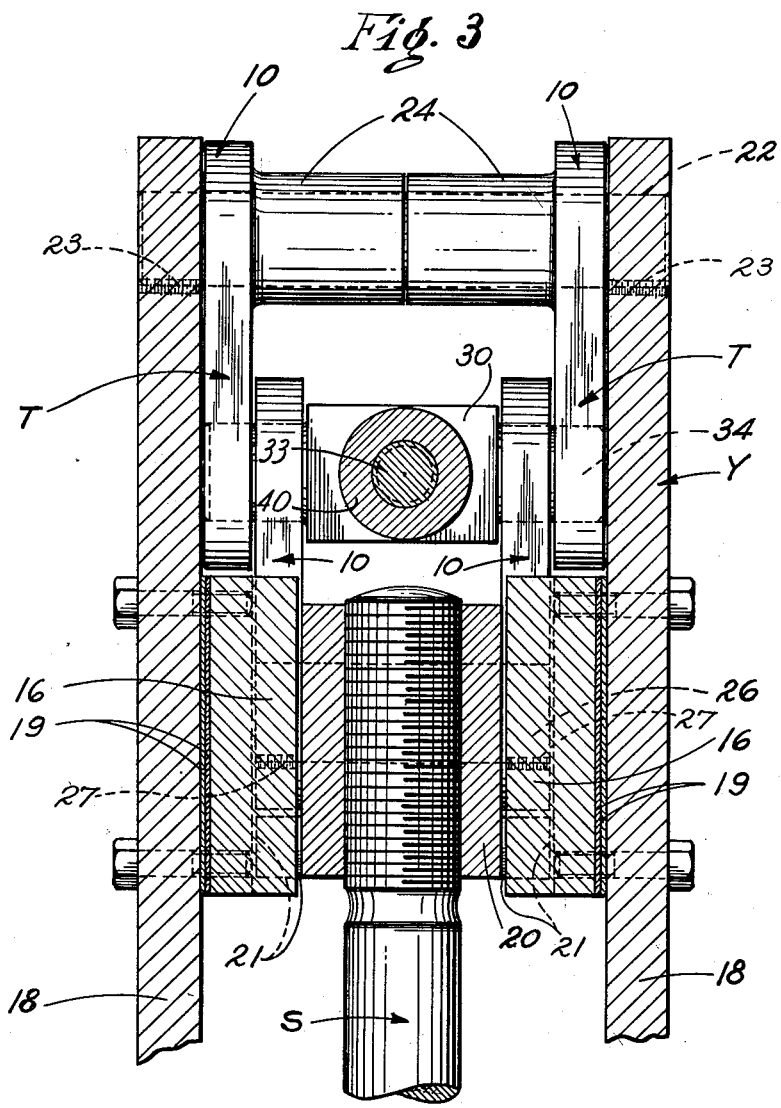

2,603,102

UNITED STATES PATENT OFFICE 2,603,102

VALVE CLOSURE MEANS

James Clarence Hobbs, Painesville, Ohio

Application November 15, 1946, Serial No. 710,003

20 Claims. (Cl. 74—520)

The present invention relates generally to valves and is particularly concerned with novel valve actuating means.

A considerable number and variety of means for regulating the flow of fluid through valves of various designs, particularly those of large capacity which are employed in high pressure systems, have heretofore been developed. The toggle type is one type of such means, and it conventionally comprises four relatively long links pivotally fastened at their lower ends to a valve bonnet and four shorter links pivoted to the upper ends of long links and to the valve stem. This type of toggle arrangement is normally actuated by a threaded rod which threadwise engages blocks secured to the upper ends of both the long and short links and a wheel for rotating the rod and thus raising or lowering the valve stem to open or close the valve. Since the upper ends of the long links are not secured to the valve bonnet, regulation of fluid flow through the valve results in arcuate movement of the upper ends with respect to the valve bonnet and stem. Undesirable stresses are thereby applied to the elements of the toggle as well as the valve stem and make valve stems of relatively great size and strength necessary. These toggles have a further undesirable feature in that threaded nuts and bolts are required in their construction, and their maintenance is therefore difficult and expensive. These toggles in addition are difficult to lubricate.

The actuating means of my invention enables the employment of a stem which has a diameter substantially smaller than those heretofore employed in toggle type valves and is no larger than necessary to carry the fluid load of the valve. This means also overcomes the lubrication difficulties of toggle type valves in an economical manner and does not involve threaded nuts and bolts to hold the toggles in position and together. There are no parts to work loose and become disengaged in my devices and their maintenance is accordingly not a problem. Furthermore, the present actuating means in a preferred form automatically prevents overloading of valve seating surfaces, and automatically permits relative movement of valve stem to valve seating surfaces in accordance with changes in load pressures due to changes in temperature in parts of the valve, or other causes. In addition, the means of my invention is more effective than the toggle type above described since there is no negative movement of the upper end of the toggle to the valve stem to decrease the effect of the toggle in moving the stem.

The valve actuating mechanism of this invention is secured to an exterior frame member of a valve and is thereby maintained in position and operating relationship to the valve. Movement of this mechanism and of the stem of the valve is guided to assure maximum effect in actuation of the valve and constant alignment of the parts. Moreover, the guiding means in one form is adjustable to valve actuating means of this invention of a variety of dimensions.

Those skilled in the art will gain a further understanding of the present invention by referring to the drawings accompanying and forming a part of this specification, in which Figure 1 is a perspective view of a valve assembly including valve closure means of my invention;

Figure 2 is a vertical cross-sectional view of valve closure means of this invention; and Figure 3 is a view taken on line 3—3 of Fig. 2.

The actuating means of this invention generally comprises a valve stem, a toggle comprising a lower link which is pivotally attached to the stem and an upper link which is attached to an element fixed in position relative to the valve body, and means for moving the links relative to each other thereby to move the stem relative to the valve body.

The illustrated actuating means more specifically comprises a valve body B, a valve stem S, a valve yoke Y, a toggle T composed of eight links 10 arranged in pairs and secured pivotally to stem S and yoke Y, and stem moving means M, and guide ribs 16.

Referring to Fig. 1, the valve illustrated is of the gate type in which the stem S is movable endwise to move a valve in the valve body and thereby to regulate the flow of fluid through the valve body. The yoke Y stands as a superstructure above the upper end of the stem and is provided with a plurality of apertures to receive securing means for the toggle T and two plates 15 each of which has a guide rib portion 16. The yoke is generally cylindrical in its lower portion and is engaged in that portion directly with the body of the valve by means of a split ring 17 in accordance with the disclosure of my co-pending application Serial Number 757,762 filed June 28, 1947. The upper portion comprises two parallel, upwardly extending, relatively thin, flat arms 18. This upper portion is provided with the apertures aforementioned.

The stem S is an elongated shaft having a threaded end portion and another end portion carrying a valve sealing disc (not shown), within the valve body, B.

Guide ribs 16 are adjustable relative to the yoke and stem S by means of shims 19 disposed between plates 15 and the inner surfaces of arms 18. Depending upon the distance which ribs 16 should be disposed apart, a larger or smaller shim may be inserted between one or both the plates 15 and arms 18.

A crosshead 20 having a threaded aperture is threadwise engaged with the stem S and is provided with four guide lugs 21 for engagement with ribs 16 to guide the crosshead and stem in movement relative to the yoke. The guide lugs are arranged in pairs on opposite sides of the crosshead and the components of each pair are disposed apart to define a groove to receive one of the ribs 16.

The toggle T is an assembly of eight links 10 disposed in four series of link pairs or toggles to define two, spaced apart, generally diamond-shaped figures which in side elevation appear as a single such figure, one being superimposed upon the other. The upper links of the link pairs are provided with transverse apertures to receive two pins having end portions extending through the sides of the yoke. Pins 22 are keyed to the yoke by keys 23 and extend through the upper links and through sleeves 24 spacing said links in pairs. The lower portions of the lower links are secured to crosshead 20 by two pins 26 which are keyed to the links by keys 27, joining the links in pairs, and which extend through the two transverse apertures provided in the crosshead. Pins 26 are maintained in position by plates 15 between which the pins may move horizontally to a small extent. The pins 22 are spaced relatively close together while pins 26 are disposed apart a greater distance to permit stem S to extend between them.

There are four sleeves 24 which are arranged in pairs, each sleeve being welded to one of the upper links and in assembly in effect defining with the sleeve opposed a single sleeve element.

The means M comprises two rectangular blocks 30 and 31, a shaft 33 having a threaded end portion, and a hand wheel 37 keyed to the shaft for rotating said shaft and actuating the toggle T and stem S to regulate fluid flow through the valve.

The blocks 30 and 31 are provided with central apertures to receive shaft 33 and with trunnions 34 to secure the upper and lower links of each link pair together in a toggle knee joint. Block 30 is disposed adjacent to the threaded end portion of the shaft and is threadwise engaged with the shaft, while block 31 is disposed at the opposite end of the shaft adjacent to hand wheel 37. The aperture of block 31 is enlarged in its outer portions to receive two ball bearing assemblies 45 and annular springs 46 to enable resilient adjustment of stem S.

A nut 40 having a threaded aperture is disposed in threadwise engagement with bearing assembly 45 and is provided with a skirt portion extending in the direction of the threaded end of the shaft and block 30. Nut 40 is keyed to shaft 33 by means of a set screw and is so dimensioned as to engage blocks 30 and 31 and thereby prevent further movement of stem S toward the valve body when such movement would overload and damage the valve.

In assembling the illustrated valve, the crosshead carrying pins 26 is threaded upon the end of stem S. Shaft 33 and hand wheel 37 are secured together and blocks 30 and 31 and nut 40 are engaged with the shaft, as shown. The four lower links of the toggle T are then engaged with the trunnions of the blocks 30 and 31 and the lower ends of these links are keyed to pins 26. The upper four links of the toggle T are then engaged with the trunnions and yoke Y is secured to the valve body, as shown in Fig. 1. As the final steps, pins 22 are inserted through appropriate apertures in the yoke Y and are keyed to the yoke, and guide ribs 16 are disposed in position and secured to the arms of the yoke by studs extending through apertures in yoke Y and into plates 15 bearing the ribs.

The disassembling operation may be accomplished by reversing the above procedure, or in any other convenient manner, such as by loosening ring 17, disengaging crosshead 20 from the stem by rotating the yoke and toggle assembly relative to the stem and body, and removing pins 22 and lifting the toggle assembly from within the yoke.

The use of the valve actuating means illustrated to regulate fluid flow through a valve merely involves rotation of hand wheel 37 to move toggle T to raise or lower stem S and thereby increase or decrease the flow of fluid in the valve. Regulation of fluid flow in this manner cannot be injurious to the valve seating surfaces or discs because movement of the stem to close the valve beyond a predetermined point is impossible because of block 40. Any tendency for the toggles to move beyond a predetermined point out of alignment with each other and the crosshead will be prevented by plates 15 of the guides.

Although I have illustrated and described in detail the double toggle form of this invention in which the links are pivotally secured to the crosshead and yoke, by means of pins keyed to the yoke and other pins keyed to the links and extending through the crosshead, those skilled in the art will appreciate that the invention encompasses a wider field, including single toggles and toggles in which links are not thus secured to the yoke and stem, but are joined thereto in manners well known to the art. It will also be understood that while I have disclosed toggles disposed to define diamond-shaped figures in side elevation, they may define any suitable shapes and it is not necessary in double toggle assemblies that the shapes be the same or have the same dimensions.

Having thus described the present invention so that those skilled in the art will be able to practice and understand the same, I state that what I desire to secure by Letters Patent is defined in what is claimed.

What is claimed is:

1. Valve actuating means comprising a valve body, a valve stem movable endwise in said body, a yoke attached to said body and provided with an elongated guide, a crosshead secured to the end of the valve stem and having means to engage said guide so that the crosshead will be guided in movement relative to said yoke, a pair of toggles cooperating to define a diamond in cross section and having lower links pivotally secured in their lower portions to said crosshead and upper links pivotally secured in their upper portions to said yoke, and means for moving the links relative to each other to move said stem relative to the body, said means including a block for limiting movement of the stem to prevent movement of the stem beyond a predetermined extent, and a spring for resiliently opposing movement of the stem.

2. Valve actuating means comprising a valve body, a valve stem movable endwise in said body, a yoke provided with an elongated guide, a crosshead secured to the end of the valve stem and having means to engage said guide so that the crosshead will be guided in movement relative to said yoke, and a pair of toggles having knee joints and upper and lower end portions secured to the crosshead and cooperating to define a diamond in cross section, and means for moving the toggles relative to each other to move said stem relative to the valve, said moving means comprising a block having a threaded aperture and being secured to the knee portion of a toggle, a second block having an aperture and being engaged with the knee portion of the other toggle, a shaft having a threaded portion and extending through said apertured blocks and being threadwise engaged with the first mentioned block, a lock nut threadwise engaged with and keyed to said shaft to retain the second mentioned block in position relative to the shaft, a hand wheel keyed to said shaft adjacent to said second mentioned block, a thrust bearing in said block engaging a shoulder on said shaft adjacent to said hand wheel, another thrust bearing in said block engaging the lock nut, and springs between the first mentioned thrust bearing and the said block to resiliently oppose movement of the blocks relative to each other.

3. Valve actuating means comprising a valve body, a valve stem movable endwise in said body, an apertured yoke provided with an elongated guide, an apertured crosshead fastened to an end of the valve stem and having means to engage said guide so that the crosshead will be guided in movement relative to said yoke, a double toggle having a pair of lower links pivotally attached at their lower ends to said crosshead and a pair of upper links pivotally attached at their upper ends to said yoke, means for moving the links relative to each other to move said stem relative to the body, and means for pivotally attaching the toggle links to the crosshead and yoke comprising a pin keyed to the lower links and partially disposed in an aperture in the crosshead, and a pin connecting the upper links and keyed to the yoke.

4. Valve actuating means comprising a valve body, a valve stem movable endwise in said body, an apertured yoke, an apertured crosshead having grooved opposite sides, a pair of guide ribs adjustably secured to the yoke for engagement with the grooved sides of the crosshead to guide said crosshead in movement relative to the yoke, a double toggle having a pair of lower links pivotally attached at their lower ends to said crosshead and a pair of upper links pivotally attached at their upper ends to said yoke, means for moving the links relative to each other to move said stem relative to the body, and means for pivotally attaching the toggle links to the crosshead and yoke comprising a pin keyed to the lower links and partially disposed in an aperture in the crosshead, and a pin connecting the upper links and keyed to the yoke.

5. Valve actuating means comprising a valve body, a stem movable endwise in said body, a toggle having two sets of links, the lower links being pivotally associated with said stem and the upper links being pivotally attached at their upper ends to an element fixed in position relative to the body, means for moving the upper and lower links relative to each other to move said stem relative to the body, and means including a spring for resiliently opposing movement of said link moving means.

6. Valve actuating means comprising a valve body, a stem movable endwise in said body, a toggle having two sets of links, the lower links being pivotally associated with said stem and the upper links being pivotally attached at their upper ends to an element fixed in position relative to the body, shaft means for moving the upper and lower links relative to each other to move said stem relative to the body, means for limiting movement of the stem including a stop surrounding and fixed in position on said shaft.

7. Apparatus for actuating a valve in a valve body comprising a yoke having spaced, parallel arms, parallel spaced pins connecting and keyed to the free ends of said arms, a valve stem extending from the body into the space between said arms, a crosshead attached to the stem between said arms, and toggle means connected to said pins and to said crosshead, said means including two pairs of upper links having opposed sleeves at their upper ends rotatably mounted on said pins, two pairs of lower links, pins keyed to the lower ends of the pairs of lower links and extending through the crosshead for rotation relative thereto, blocks rotatably connecting the adjacent ends of the pairs of upper and lower links, and a rotatable screw extending through said blocks and having bearing engagement with one block and threaded engagement with the other block.

8. Apparatus for actuating a valve in a valve body comprising a yoke having spaced, parallel arms, parallel spaced pins connecting and keyed to the free ends of said arms, a valve stem extending from the body into the space between said arms, a crosshead attached to the stem between said arms, and toggle means connecting said pins to said crosshead, said means including two pairs of upper links rotatably mounted at their upper ends on said pins, two pairs of lower links, pins connecting the lower ends of the lower links and extending through the crosshead, blocks rotatably connecting the adjacent ends of the pairs of upper and lower links, bearings in one of said blocks and a rotatable screw extending through said blocks and having bearing engagement with said bearings and threaded engagement with the other block, and a stop nut threaded to and fixed in position on the screw and having annular end surfaces engaging one block and a bearing in the other block.

9. Apparatus for actuating a valve in a valve body comprising a yoke having spaced, parallel arms, parallel spaced pins connecting and keyed to the free ends of said arms, a valve stem extending from the body into the space between said arms, a crosshead attached to the stem between said arms, and toggle means connecting said pins to said crosshead, said means including two pairs of upper links rotatably mounted at their upper ends on said pins, two pairs of lower links, pins connecting the lower ends of the lower links and extending through the crosshead, blocks rotatably connecting the adjacent ends of the pairs of upper and lower links, bearings in one of said blocks a rotatable screw extending through said blocks and having bearing engagement with said bearings and threaded engagement with the other block, a stop nut keyed to the screw and engaging one of said bearings, and engageable with the other block, and annular spring means between the screw and the bearing carrying block to oppose endwise relative movement of the screw and block.

10. Apparatus for actuating a valve in a valve body comprising a yoke having spaced, parallel arms, parallel spaced pins connecting and keyed to the free ends of said arms, a valve stem extending from the body into the space between said arms, a crosshead attached to the stem between said arms, and toggle means connecting said pins to said crosshead, said means including two pairs of upper links rotatably mounted at their upper ends on said pins, two pairs of lower links, pins connecting the lower ends of the lower links and extending through the crosshead, blocks rotatably connecting the adjacent ends of the pairs of upper and lower links, a rotatable screw extending through said blocks and having bearing engagement with one block and threaded engagement with the other block, and annular spring means between the screw and the bearing carrying block to oppose endwise relative movement of the screw and block.

11. Apparatus for actuating a valve in a valve body comprising a yoke having spaced, parallel arms, parallel, spaced pins connecting and keyed to the free ends of said arms, a valve stem extending from the body into the space between said arms, a crosshead attached to the stem between said arms, and toggle means connected to said pins and to said crosshead, said means including two pairs of upper links, said links lying close to the sides of said arms and having opposed sleeves at their upper ends rotatably mounted on said pins, two pairs of lower links lying close to said upper links, and pins keyed to the lower ends of said lower links and extending through the crosshead for rotation relative thereto.

12. Apparatus for actuating a valve in a valve body comprising a yoke having spaced, parallel arms, pins connecting the free ends of said arms, a valve stem extending from the body into the space between said arms, a crosshead attached to the stem between said arms, guides positioned on the opposed sides of said arms and guidingly engaging said crosshead, and toggle means connected to said pins and to said crosshead, said means including two pairs of upper links, said links lying close to the inner sides of said arms, two pairs of lower links lying close to the crosshead and to the inner sides of said guides and upper links, and pins extending through the crosshead and into the lower links and stopping short of the guides.

13. Apparatus for actuating a valve in a valve body comprising a yoke having spaced, parallel arms, pins connecting and keyed to the free ends of said arms, a valve stem extending from the body into the space between said arms, a crosshead attached to the stem between said arms, guides positioned on the opposed sides of said arms and guidingly engaging said crosshead, and toggle means connected to said pins and to said crosshead, said means including two pairs of upper links lying close to the sides of said arms and rotatably mounted at their upper ends on said pins, two pairs of lower links lying between and close to the guides and crosshead and close to the inner side of said upper links, pins connecting the lower ends of said lower links and extending through the crosshead, blocks rotatably connecting the adjacent ends of the pairs of upper and lower links, and a rotatable screw extending through said blocks and having bearing engagement with one block and threaded engagement with the other block.

14. Apparatus of the class described comprising a yoke, guide means adjustably fixed to said yoke, a member movably engaging said guide means, two parallel sets of toggles arranged in two diamond-shaped figures, each set comprising two outer links pivotally anchored at one end and two inner links pivoted to said movable member at their inner ends, means pivotally connecting the opposed ends of the links, said means including blocks disposed between the sets of toggles with each block pivotally connecting the adjacent ends of two links of each set of toggles, and means extending between and operatively associated with said blocks for moving them toward and away from one another.

15. Apparatus of the class described comprising a guided movable member, two parallel sets of toggles between said arms and arranged in two diamond-shaped figures, each set comprising two outer links pivotally anchored at one end and two inner links pivoted at their outer ends to said movable member, means pivotally connecting the opposed ends of the links, said means including blocks disposed between the sets of toggles and each block pivotally connecting the adjacent ends of two links of each set of toggles, a screw extending through said blocks for moving them toward and away from one another, bearings in one of said blocks around said screw and a stop on said screw and engageable with one of said blocks and with one of said bearings in the other block to limit the extent of movement of the blocks toward each other.

16. Apparatus of the class described comprising a guided movable member, two parallel sets of toggles between said arms and arranged in two diamond-shaped figures, each set comprising two outer links pivotally anchored at one end and two inner links pivoted at their outer ends to said movable member, means pivotally connecting the opposed ends of the links, said means including blocks disposed between the sets of toggles and each block pivotally connecting the adjacent ends of two links of each set of toggles, a screw extending through said blocks for moving them toward and away from one another, bearings in one of said blocks around said screw, a stop on said screw and engageable with one of said blocks and with one of said bearings in the other block to limit the extent of movement of the blocks toward each other, and resilient means in one block engaging said screw to absorb force applied by said screw when movement of the blocks away from each other is resisted.

17. Apparatus of the class described comprising a yoke having spaced arms connected at their inner and outer ends, a crosshead between and guided in straight line movement by said arms, a stem screw-threaded in said crosshead, said stem and crosshead being relatively rotatable for axial positioning of the stem, two parallel sets of toggles between said arms and arranged in two diamond-shaped figures, each set comprising two links pivoted at their inner ends to the crosshead and two other links pivoted at their outer ends to the yoke, means pivotally connecting the opposed ends of the links, said means including blocks disposed between the sets of toggles with each block pivotally connecting the adjacent ends of two links of each set of toggles, and means extending between and operatively associated with said blocks for moving them toward and away from one another to move said crosshead.

18. Valve actuating means comprising a valve body, a valve stem movable endwise in said body, an apertured yoke provided with an elongated guide, an apertured crosshead fastened to one end of the valve stem and having means to engage said guide so that the crosshead will be guided in movement relative to said yoke, a double toggle having a pair of lower links and a pair of upper links, means for pivotally attaching the toggle links to the crosshead and yoke comprising a pin keyed to the lower links and partially disposed in an aperture in the crosshead and a pin connecting the upper links to the yoke, and means for moving the links relative to each other to move the stem relative to the body.

19. Valve actuating means comprising a valve body, a valve stem movable endwise in said body, an apertured yoke provided with an elongated guide, an apertured crosshead fastened to one end of the valve stem and having means to engage said guide so that the crosshead will be guided in movement relative to said yoke, a double toggle having a pair of lower links and a pair of upper links, means for pivotally attaching the toggle links to the crosshead and yoke comprising a pin in the lower links partially disposed in an aperture in the crosshead and a pin connecting the upper links and keyed to the yoke, and means for moving the links relative to each other to move the stem relative to the body.

20. Apparatus of the class described comprising a guided movable member, two parallel sets of toggles arranged in two diamond-shaped figures, each set comprising two outer links pivotally anchored at one end and two inner links pivoted at their remote ends to said movable member, means pivotally connecting the adjacent ends of the links, said means including blocks disposed between the sets of toggles with each block pivotally connecting the adjacent ends of two links of each set of toggles, a screw extending through said blocks for moving them toward and away from one another, bearings in one of said blocks around said screw, and a spring in one block engaging said screw to absorb force applied by said screw when movement of the blocks away from each other is resisted.

JAMES CLARENCE HOBBS.

REFERENCES CITED

The following references are of record in the file of this patent:

UNITED STATES PATENTS

| Number | Name | Date |
|---|---|---|
| 100,607 | Curtis | Mar. 8, 1870 |
| 161,751 | Butterworth | Apr. 6, 1875 |
| 385,356 | Johnson | July 3, 1888 |
| 925,673 | Zook | June 22, 1909 |
| 1,241,308 | Heuvel | Sept. 25, 1917 |
| 1,713,402 | Shivers | May 14, 1929 |
| 2,370,604 | DeCraene et al. | Feb. 27, 1945 |
| 2,515,498 | DeCraene et al. | July 18, 1950 |